United States Patent
Kim

(10) Patent No.: US 8,294,826 B2
(45) Date of Patent: Oct. 23, 2012

(54) METHOD AND APPARATUS FOR PICTURE QUALITY COMPENSATIVE BASED ON FIELD INTENSITY

(75) Inventor: Min Kyung Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 628 days.

(21) Appl. No.: 12/375,264

(22) PCT Filed: Jul. 30, 2007

(86) PCT No.: PCT/KR2007/003651
§ 371 (c)(1),
(2), (4) Date: Oct. 27, 2009

(87) PCT Pub. No.: WO2008/013433
PCT Pub. Date: Jan. 31, 2008

(65) Prior Publication Data
US 2010/0053447 A1    Mar. 4, 2010

(30) Foreign Application Priority Data
Jul. 28, 2006 (KR) .................. 10-2006-0071603

(51) Int. Cl.
*H04N 5/00* (2006.01)

(52) U.S. Cl. ............ 348/607; 348/608; 348/E5.078; 386/211; 386/214; 386/283; 386/5.003

(58) Field of Classification Search .................. None
See application file for complete search history.

(56) References Cited

U.S. PATENT DOCUMENTS

| | | | |
|---|---|---|---|
| 5,929,929 A * | 7/1999 | Yang | 348/565 |
| 2004/0208478 A1* | 10/2004 | Nishimura | 386/46 |
| 2006/0197875 A1 | 9/2006 | Muto et al. | |

FOREIGN PATENT DOCUMENTS

| | | |
|---|---|---|
| CN | 1215962 | 5/1999 |
| CN | 1627803 | 6/2005 |
| EP | 1 677 543 | 7/2006 |
| JP | 2004-112202 | 4/2004 |
| JP | 2004112202 A * | 4/2004 |

(Continued)

OTHER PUBLICATIONS

Chinese Patent Gazette dated Jun. 8, 2011 (Application No. 200780033213.2).

(Continued)

*Primary Examiner* — Jefferey Harold
*Assistant Examiner* — Omer Khalid
(74) *Attorney, Agent, or Firm* — KED & Associates LLP

(57) ABSTRACT

An apparatus and method for compensating for the picture quality of a stored broadcast signal are disclosed. For reproduction of a broadcast signal stored in a television, the picture quality of the stored broadcast signal is compensated for, based on a predetermined. MPEG noise reduction value corresponding to the electric field strength of the stored broadcast signal. Therefore, it is possible to provide the optimum picture quality. When a broadcast signal is stored, it is stored together with the electric field strength, thereof. When the stored broadcast signal is reproduced, block noise, of a screen is efficiently removed by applying an MPEG, noise reduction value corresponding to the electric field strength of the stored broadcast signal to the stored broadcast signal. Therefore it is possible to improve the definition of the screen.

20 Claims, 4 Drawing Sheets

FOREIGN PATENT DOCUMENTS

| | | |
|---|---|---|
| JP | 2006-060358 | 3/2006 |
| KR | 10-1999-0073699 | 10/1999 |
| KR | 10-1999-0082655 | 11/1999 |
| KR | 10-2002-0054575 | 7/2002 |
| KR | 10-2006-0016770 | 2/2006 |

OTHER PUBLICATIONS

Korean Notice of Allowance dated Jan. 21, 2008.
European Search Report dated Mar. 10, 2010.
International Search Report dated Jan. 28, 2008.

* cited by examiner

[Before picture quality compensation]

[After picture quality compensation]

FIG. 4

| Electric field strengthdB(uV) | AGC Level on CPU(V) | MPEG NR Data |
|---|---|---|
| 25 | 3.021 | 63 |
| 30 | 3.024 | 62 |
| 35 | 3.021 | 58 |
| 40 | 3.022 | 54 |
| 45 | 3.021 | 50 |
| 50 | 3.021 | 46 |
| 52 | 3.021 | 42 |
| 54 | 3.021 | 38 |
| 56 | 3.021 | 34 |
| 57 | 3.021 | 30 |
| 59 | 3.021 | 26 |
| 60 | 2.007 | 22 |
| 62 | 1.724 | 18 |
| 64 | 1.585 | 14 |
| 66 | 1.475 | 10 |
| 68 | 1.374 | 6 |
| 70 | 1.294 | 5 |
| 72 | 1.222 | 4 |
| 74 | 1.163 | 3 |
| 76 | 1.108 | 2 |
| 78 | 1.058 | 1 |
| 80 | 1.013 | 0 |
| 85 | 0.894 | 0 |
| 90 | 0.768 | 0 |
| 95 | 0.634 | 0 |
| 100 | 0.529 | 0 |
| 105 | 0.445 | 0 |
| 110 | 0.371 | 0 |

METHOD AND APPARATUS FOR PICTURE QUALITY COMPENSATIVE BASED ON FIELD INTENSITY

TECHNICAL FIELD

The present invention relates to an electric field strength-based picture quality compensation apparatus and method wherein a moving picture experts group (MPEG) noise reduction value is adjusted depending on the electric field strength of a broadcast signal currently inputted to a television (TV) or a signal recorded/stored in the TV so that a picture of the best quality can be displayed.

BACKGROUND ART

In general, a broadcast signal inputted to a TV includes a large amount of noise when it is low in electric field strength. For this reason, the TV recognizes such noise as radio frequency data and generates significant noise, which appears constantly on a block-by-block basis, according to process amounts in MPEG encoding and decoding.

In this connection, an MPEG noise reduction function has been applied to a conventional TV picture quality control apparatus to remove block noise of a real-time broadcast signal tuned by a tuner or a recorded/stored data signal based on the electric field strength of the broadcast signal or data signal.

DISCLOSURE

Technical Problem

An object of the present invention devised to solve the problem lies on an electric field strength-based picture quality compensation apparatus and method wherein MPEG noise reduction values are applied differently according to the electric field strengths of broadcast signals to efficiently remove block noise of the broadcast signals.

Technical Solution

The object of the present invention can be achieved by providing an electric field strength-based picture quality compensation method comprising: storing a received broadcast signal together with an electric field strength thereof; determining the electric field strength of the stored broadcast signal for reproduction of the stored broadcast signal; selectively applying a predetermined moving picture experts group (MPEG) noise reduction value corresponding to the electric field strength of the stored broadcast signal to the broadcast signal to compensate for picture quality of the broadcast signal; and displaying the broadcast signal with the picture quality compensated for based on the electric field strength.

The broadcast signal may be a digital signal or analog signal.

The broadcast signal with the picture quality compensated for based on the electric field strength may be a recorded/stored signal or a signal temporarily stored by a time shift function.

The MPEG noise reduction value may be stored in the form of a table correspondingly to the electric field strength of the broadcast signal and may be set as a default in a manufacturing process of a television.

In another aspect of the present invention, provided herein is an electric field strength-based picture quality compensation apparatus comprising: a memory for storing a predetermined MPEG noise reduction value corresponding to an electric field strength of a broadcast signal; an electric field strength determiner for extracting an automatic gain control (AGC) voltage varying with the electric field strength of the broadcast signal and determining the electric field strength of the broadcast signal based on the extracted AGC voltage; a personal video recorder (PVR) module for storing the broadcast signal together with the electric field strength of the broadcast signal provided from the electric field strength determiner; and a controller for, when reproducing the stored broadcast signal, applying, to the stored broadcast signal, the MPEG noise reduction value corresponding to the electric field strength stored together with the broadcast signal, to compensate for picture quality of the broadcast signal.

The broadcast signal may be a digital signal or analog signal.

The broadcast signal with the picture quality compensated for based on the electric field strength may be a recorded/stored signal or a signal temporarily stored by a time shift function.

The memory may store the MPEG noise reduction value in the form of a table correspondingly to the electric field strength of the broadcast signal, and the MPEG noise reduction value in the memory may be set as a default in a manufacturing process of a television.

Advantageous Effects

When a broadcast signal is stored, it is stored together with the electric field strength thereof. When a recorded broadcast is reproduced, block noise is removed by applying an MPEG noise reduction value corresponding to the electric field strength of a broadcast signal selected for reproduction to the selected broadcast signal. Therefore, it is possible to provide the optimum picture quality. Further, MPEG noise reduction values are applied differently according to the electric field strengths of broadcast signals, so that the definition of a broadcast signal with high electric field strength may also be maintained as it is. Therefore, it is possible to provide a recorded broadcast of the same picture quality as that of a real-time broadcast.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a view illustrating a comparison between the picture quality of a picture quality-compensated screen according to an embodiment of the present invention and a conventional picture quality.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

Besides, although terms used in the present invention are possibly selected from the currently well-known ones, some terms are arbitrarily chosen by the inventor in some cases so that their meanings are explained in detail in the following description. Hence, the present invention should be understood with the intended meanings of the corresponding terms chosen by the inventor instead of the simple names or meanings of the terms themselves.

Figure 1:
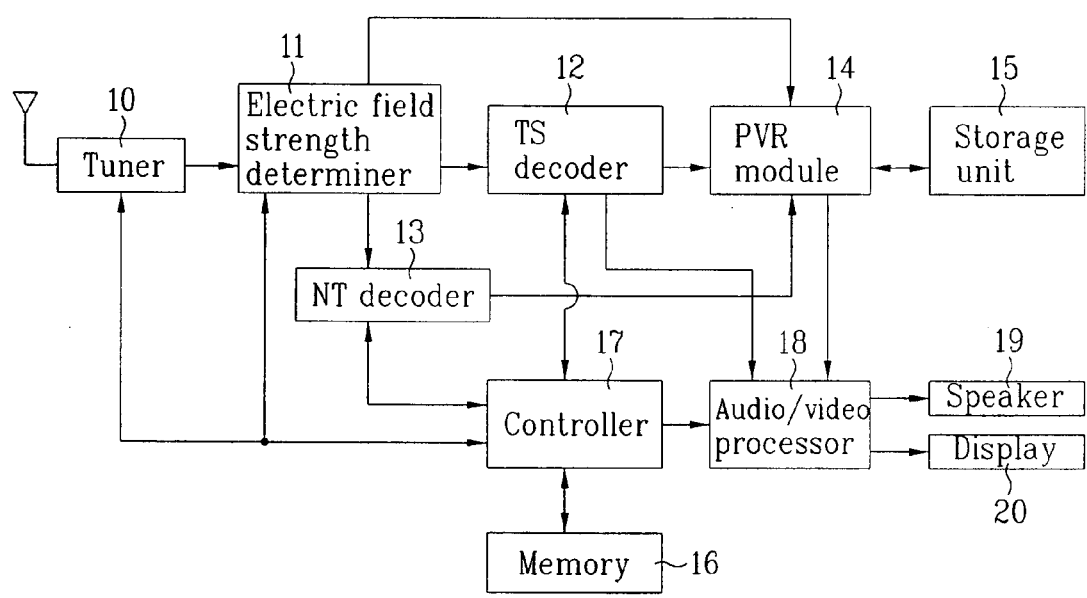
FIG. 1 is a block diagram showing the configuration of a TV picture quality compensation apparatus according to an embodiment of the present invention.

FIG. 1 is a block diagram showing the configuration of a TV picture quality compensation apparatus according to an embodiment of the present invention.

The picture quality compensation apparatus according to this embodiment is applicable to a TV with a personal video recorder (PVR) function, and comprises, as shown in FIG. 1, a memory 16 for storing MPEG noise reduction data based on electric field strengths, a controller 17 for controlling the entire operation of the TV, a tuner 10 for performing a broadcast channel tuning operation under the control of the controller 17, an electric field strength determiner 11 for determining the electric field strength of a broadcast signal received through the tuner 10, a transport stream (TS) decoder 12 for decoding a digital broadcast signal, an NT decoder 13 for decoding an analog broadcast signal, a PVR module 14 for storing and reproducing the digital broadcast signal or analog broadcast signal, and an audio/video processor 18 for processing the digital broadcast signal, the analog broadcast signal, or audio/video broadcast data provided from the PVR module 14.

The controller 17 acts to control the entire operation of the TV. Particularly, in the present embodiment, the controller 17 reproduces broadcast data recorded/stored by the user or temporarily stored by a time shift function. At this time, the controller 17 extracts, from the memory 16, an MPEG noise reduction value corresponding to the electric field strength of a broadcast signal selected for reproduction, stored together with the selected broadcast signal correspondingly thereto, and applies the extracted value to the selected broadcast signal to remove block noise of that broadcast signal so as to compensate for the picture quality thereof.

Further, the controller 17 acts to store the electric field strength of a received broadcast signal together with the broadcast signal correspondingly thereto when storing the broadcast signal in the PVR module 14.

Here, MPEG noise reduction values are pre-stored in the memory 16 in the form of a table correspondingly respectively to the electric field strengths of broadcast signals, and are defaults which are properly set in a manufacturing process of the TV to provide the optimum picture quality.

Figure 3:
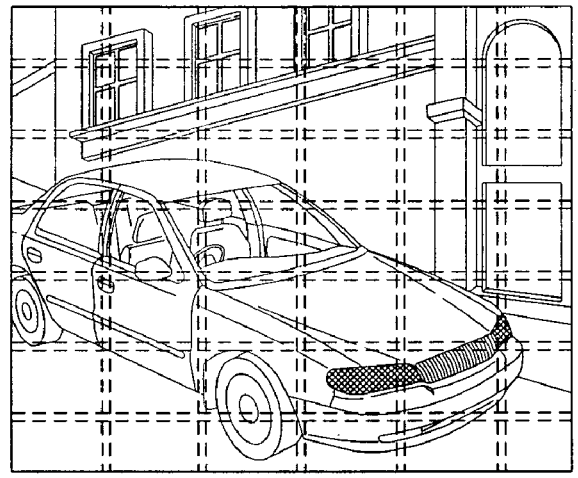
FIG. 3 is a table of data for picture quality compensation applied based on electric field strengths according to an embodiment of the present invention.
Figure 3:
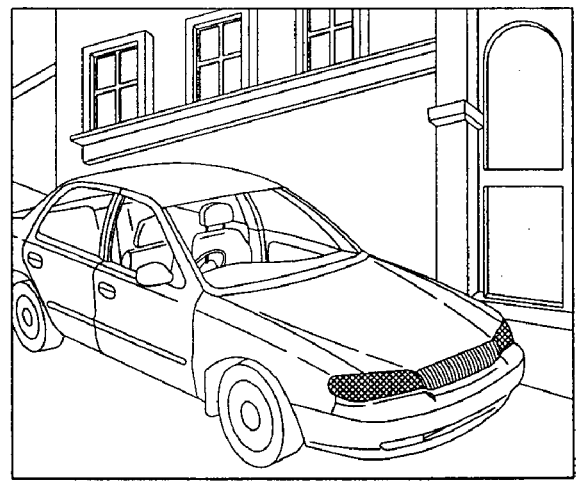

A table of MPEG noise reduction data applied according to an embodiment of the present invention is shown in FIG. 3.

A broadcast signal whose picture quality is to be compensated for based on the electric field strength thereof by the controller 17 is a digital or analog broadcast signal recorded/stored in the PVR module 14 to be described later.

Here, the broadcast signal stored in the PVR module 14 becomes low in electric field strength while going through encoding and decoding processes until it is received and stored by the TV.

Therefore, the controller 17 applies an MPEG noise reduction value preset in the memory 16 to the broadcast signal stored in the PVR module 14 to remove a block noise phenomenon thereof. Meanwhile, provided that the broadcast signal stored in the PVR module 14 is high in electric field strength, the controller 17 compensates for the picture quality of the stored broadcast signal to maintain the definition thereof as it is.

The tuner 10 tunes a channel of broadcast data inputted through an antenna or cable under the control of the controller 17.

When a digital broadcast signal is received over the tuned channel, it is provided to the TS decoder 12, which then decodes the digital broadcast signal. Alternatively, when an analog broadcast signal is received over the tuned channel, it is provided to the NT decoder 13, which then decodes the analog broadcast signal.

The TS decoder 12 decodes the digital broadcast signal provided from the tuner 10 to convert it into an audio stream, video stream and data stream.

The TS decoder 12 then provides the audio stream, video stream and data stream to the PVR module 14 and the audio/video processor 18 under the control of the controller 17.

The NT decoder 13 decodes the analog broadcast signal provided from the tuner 10 into audio data and video data and provides the audio data and video data to the PVR module 14 and the audio/video processor 18.

The PVR module 14 receives the digital audio stream, video stream and data stream decoded by the TS decoder 12 and stores them in a storage unit 15 under the control of the controller 17.

Alternatively, the PVR module 14 MPEG-encodes the analog audio data and video data decoded by the NT decoder 13 into audio and video streams and stores the audio and video streams in the storage unit 15.

The storage unit 15 may be, for example, a hard disk driver including a hard disk, which stores inputted audio, video and data streams along with the electric field strength of an inputted signal according to an embodiment of the present invention.

The electric field strength determiner 11 reads automatic gain control (AGC) levels of radio frequency (RF) signals of a plurality of channels, inputted in real time to the tuner 10 through the antenna or cable, determines the electric field strengths of the inputted signals based on the read AGC levels, and provides the determined electric field strengths to the controller 17.

Then, the controller 17 stores the received broadcast signals and the respective electric field strengths of the received broadcast signals determined by the electric field strength determiner 11 together in the PVR module 14.

For reproduction of a selected one of the broadcast signals stored in the PVR module 14, the controller 14 determines the electric field strength of the selected broadcast signal.

Thereafter, the controller 17 extracts an MPEG noise reduction value corresponding to the determined electric field strength from the memory 16 and applies the extracted MPEG noise reduction value to the selected broadcast signal to compensate for the picture quality of the selected broadcast signal.

The audio/video processor 18 processes audio and video data from the TS decoder 12, NT decoder 13 or PVR module 14 and outputs the processed audio data to a speaker 19 and the processed video data to a display 20, respectively.

Next, a picture quality compensation method according to an embodiment of the present invention applicable to a TV with a PVR function will be described with reference to FIGS. 2 to 4.

Figure 2:
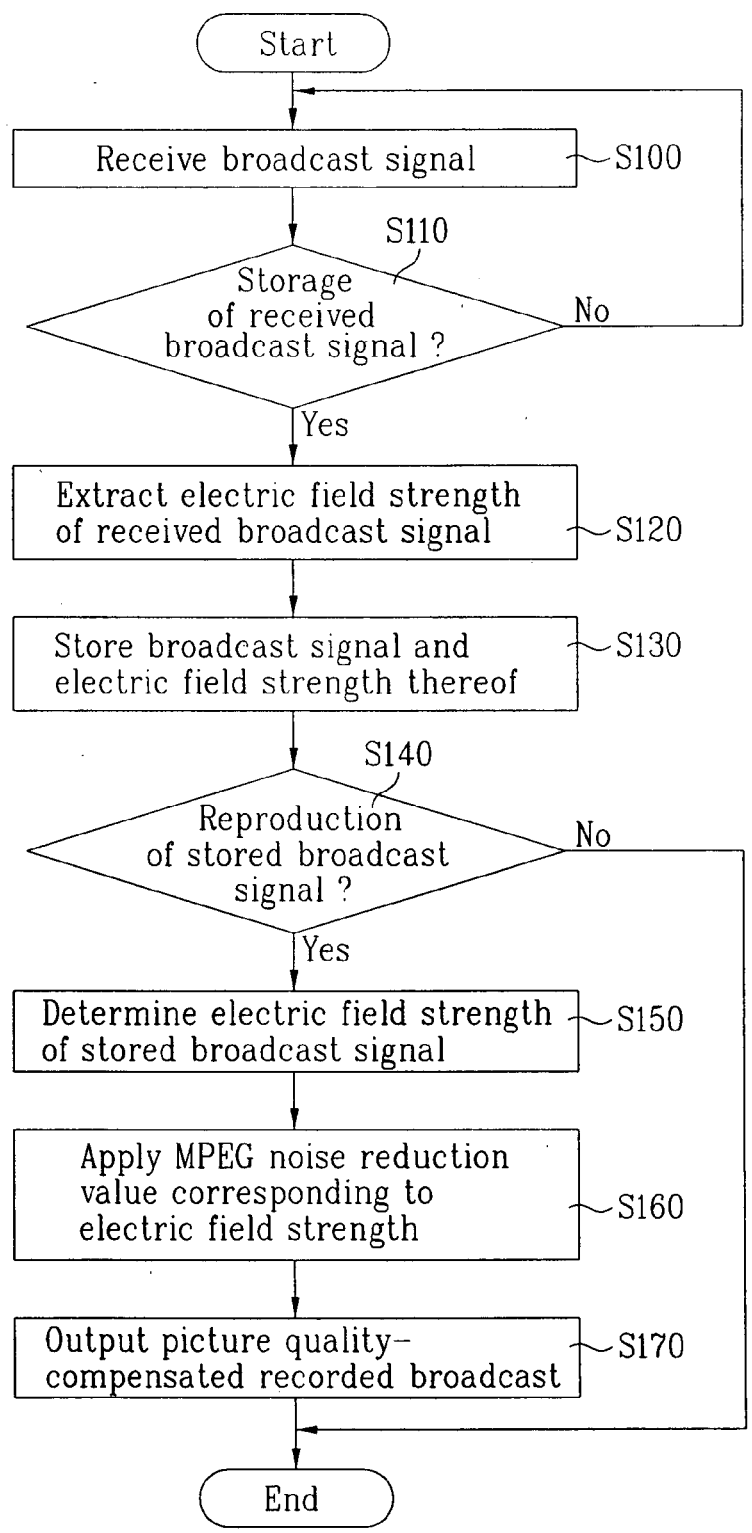
FIG. 2 is a flowchart illustrating a TV picture quality compensation method according to an embodiment of the present invention.

FIG. 2 is a flowchart illustrating a TV picture quality compensation method according to an embodiment of the present invention.

First, when the TV is powered on by the user, the controller 17 receives a broadcast signal through the tuner 10 (S100), and outputs the received broadcast signal or records/stores it in the PVR module 14 according to the user's selection.

Where the user desires to output the received broadcast signal, the controller 17 outputs the received broadcast signal by performing a general picture quality compensation method.

On the other hand, where the user inputs a storage signal to record/store the received broadcast signal in the PVR module 14 or temporarily store it through a time shift function (S110), the controller 17 controls the electric field strength determiner 11 to extract the electric field strength of the received broadcast signal.

Then, the electric field strength determiner 11 reads an AGC level varying with the electric field strength of the received broadcast signal, extracts the electric field strength of the received broadcast signal based on the read AGC level, and provides the extracted electric field strength to the controller 17 (S120).

Then, the controller 17 stores the received broadcast signal and the electric field strength of the received broadcast signal extracted by the electric field strength determiner 11 together in the PVR module 14 (S130).

Thereafter, when the user inputs a reproduction signal for the broadcast signal stored in the PVR module 14 to select reproduction of the stored broadcast signal (S140), the controller 17 determines the electric field strength stored correspondingly to the broadcast signal whose reproduction is selected (S150).

After determining the electric field strength of the broadcast signal whose reproduction is selected, the controller 17 searches a table of MPEG noise reduction data, set and stored as defaults in the memory 16 in a manufacturing process of the TV, for an MPEG noise reduction value corresponding to the determined electric field strength, and applies the searched MPEG noise reduction value to the selected broadcast signal to compensate for the picture quality of the selected broadcast signal (S160).

Here, information set and stored as defaults in the memory 16 in the form of a table includes electric field strengths dB, AGC levels, and MPEG noise reduction values to be applied correspondingly respectively thereto, as shown in FIG. 3.

Thereafter, the controller 17 continuously extracts and applies MPEG noise reduction values corresponding respectively to the electric field strengths of the subsequent broadcast signals to remove block noise of a recorded broadcast to be reproduced, so as to output the recorded broadcast with high definition (S170).

Therefore, the user can view the recorded broadcast with the same picture quality as that of a real-time broadcast.

Notably, the above-stated MPEG noise reduction table information shown in FIG. 3 includes values set to provide the optimum picture quality according to an embodiment of the present invention. It will be understood that such values are within allowable error ranges and can be modified at any time.

It can also be seen from FIG. 3 that the AGC level is low when the corresponding inputted broadcast signal is high in electric field strength and high when the corresponding inputted broadcast signal is low in electric field strength. Therefore, the electric field strength determiner 11 determines the electric field strength of the inputted broadcast signal based on such an inverse proportion relationship, and the controller 17 applies an MPEG noise reduction value appropriate to the determined electric field strength to the inputted broadcast signal.

FIG. 4 shows a broadcast signal screen with picture quality compensated for by the above-described picture quality compensation method. In detail, FIG. 4 shows a conventional screen where block noise is generated because a recorded/stored broadcast signal is reproduced by applying a fixed MPEG noise reduction value to the broadcast signal irrespective of the electric field strength of the broadcast signal, and a screen of the present invention where block noise is removed by storing an inputted broadcast signal together with the electric field strength thereof and reproducing the stored broadcast signal by applying an MPEG noise reduction value corresponding to the electric field strength of the stored broadcast signal to the stored broadcast signal to compensate for the picture quality of the stored broadcast signal.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, according to the present invention, when a broadcast signal is stored, it is stored together with the electric field strength thereof. When a recorded broadcast is reproduced, block noise is removed by applying an MPEG noise reduction value corresponding to the electric field strength of a broadcast signal selected for reproduction to the selected broadcast signal. Therefore, it is possible to provide the optimum picture quality.

In addition, MPEG noise reduction values are applied differently according to the electric field strengths of broadcast signals, so that the definition of a broadcast signal with high electric field strength may also be maintained as it is. Therefore, it is possible to provide a recorded broadcast of the same picture quality as that of a real-time broadcast.

The invention claimed is:

1. An electric field strength-based picture quality compensation method comprising:
    storing a received broadcast signal and information indicative of an electric field strength of the received broadcast signal;
    accessing the stored information indicative of the electric field strength of the stored broadcast signal for reproduction of the stored broadcast signal;
    selectively applying a noise reduction value corresponding to the accessed information indicative of the electric field strength to the stored broadcast signal to compensate for picture quality of the stored broadcast signal; and
    displaying the stored broadcast signal with the picture quality compensated for based on the accessed information indicative of the electric field strength.

2. The electric field strength-based picture quality compensation method according to claim 1, wherein the broadcast signal is a digital signal.

3. The electric field strength-based picture quality compensation method according to claim 1, wherein the broadcast signal is an analog signal.

4. The electric field strength-based picture quality compensation method according to claim 1, wherein the broadcast signal with the picture quality compensated for based on the electric field strength is a recorded/stored signal.

5. The electric field strength-based picture quality compensation method according to claim 1, wherein the broadcast signal with the picture quality compensated for based on the electric field strength is a signal temporarily stored by a time shift function.

6. The electric field strength-based picture quality compensation method according to claim 1, wherein the noise reduction value is stored in a table in correspondence with the information indicative of the electric field strength of the stored broadcast signal.

7. The electric field strength-based picture quality compensation method according to claim 6, wherein the noise reduction value is set as a default in a manufacturing process of a television.

8. An electric field strength-based picture quality compensation apparatus comprising:
   a memory configured to store a noise reduction value and information indicative of an electric field strength of a received and stored broadcast signal corresponding to the noise reduction value;
   an electric field strength determiner configured to extract information indicative of an automatic gain control (AGC) voltage, wherein the information indicative of the AGC voltage varies with the electric field strength of the stored broadcast signal, and to determine the electric field strength of the stored broadcast signal based on the extracted information indicative of the AGC voltage;
   a personal video recorder (PVR) module configured to control storing of the received broadcast signal and the determined electric field strength of the received broadcast signal; and
   a controller configured to access, when reproducing the stored broadcast signal, the information indicative of the electric field strength of the broadcast signal from the memory and to apply, to the stored broadcast signal, the noise reduction value corresponding to the accessed electric field strength, to compensate for picture quality of the broadcast signal.

9. The electric field strength-based picture quality compensation apparatus according to claim 8, wherein the broadcast signal is a digital signal.

10. The electric field strength-based picture quality compensation apparatus according to claim 8, wherein the broadcast signal is an analog signal.

11. The electric field strength-based picture quality compensation apparatus according to claim 8, wherein the broadcast signal with the picture quality compensated for based on the electric field strength is a recorded/stored signal.

12. The electric field strength-based picture quality compensation apparatus according to claim 8, wherein the broadcast signal with the picture quality compensated for based on the electric field strength is a signal temporarily stored by a time shift function.

13. The electric field strength-based picture quality compensation apparatus according to claim 8, wherein the memory stores the noise reduction value in a table and the information indicative of the electric field strength of the broadcast signal corresponding to the noise reduction value.

14. The electric field strength-based picture quality compensation apparatus according to claim 13, wherein the noise reduction value stored in the memory is set as a default in a manufacturing process of a television.

15. The electric field strength-based picture quality compensation method according to claim 1, wherein the noise reduction value is a moving picture experts group (MPEG) noise reduction value.

16. The electric field strength-based picture quality compensation method according to claim 1, wherein the broadcast signal and the information indicative of the electric field strength of the broadcast signal is stored when a request for recording the broadcast signal is received.

17. The electric field strength-based picture quality compensation method according to claim 1, further comprising:
   receiving the broadcast signal;
   identifying whether a request for recording the broadcast signal is received;
   extracting information indicative of an automatic gain control (AGC) voltage corresponding to the information indicative of the electric field strength of the broadcast signal when the request is received, wherein the information indicative of the AGC voltage varies with the electric field strength of the broadcast signal; and
   determining the electric field strength of the broadcast signal based on the extracted AGC voltage.

18. The electric field strength-based picture quality compensation method according to claim 8, wherein the broadcast signal and the information indicative of the electric field strength of the broadcast signal is stored when a request for recording the broadcast signal is received.

19. The electric field strength-based picture quality compensation apparatus according to claim 8, wherein the noise reduction value is a moving picture experts group (MPEG) noise reduction value.

20. The electric field strength-based picture quality compensation method according to claim 1, further comprising:
   storing information indicative of a plurality of predetermined electric field strength values in correspondence with a plurality of predetermined noise reduction values, wherein said accessing includes locating one of the predetermined stored electric field strength values that most closely corresponds to the electric field strength of the broadcast signal, and said applying includes applying one of the predetermined stored noise reduction values that corresponds to said one of the predetermined stored electric field values that most closely corresponds to the electric field strength of the broadcast signal.

* * * * *